United States Patent
Pfaller et al.

(10) Patent No.: US 12,304,626 B2
(45) Date of Patent: May 20, 2025

(54) ROTORCRAFT WITH A DUCTED TAIL ROTOR SUPPORTED BY A STATOR

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 66 days.

(21) Appl. No.: 18/222,583

(22) Filed: Jul. 17, 2023

(65) Prior Publication Data

US 2024/0140601 A1     May 2, 2024

(30) Foreign Application Priority Data

Oct. 28, 2022 (EP) .................................... 22204458

(51) Int. Cl.
- *B64C 27/82* (2006.01)
- *B64C 11/00* (2006.01)
- *B64C 27/54* (2006.01)

(52) U.S. Cl.
CPC ............ *B64C 27/54* (2013.01); *B64C 11/001* (2013.01); *B64C 27/82* (2013.01); *B64C 2027/8254* (2013.01)

(58) Field of Classification Search
CPC ..... B64C 27/20; B64C 27/82; B64C 29/0016; B64C 29/0025; B64C 29/0033; B64C 11/001; B64C 2027/8272
See application file for complete search history.

(56) References Cited

U.S. PATENT DOCUMENTS

| | | | |
|---|---|---|---|
| 2,369,652 A * | 2/1945 | Avery ..................... | B64C 27/82 244/76 R |
| 2,420,784 A | 5/1947 | Larsen | |
| 2,473,329 A * | 6/1949 | Candler ................. | B64C 27/82 244/17.21 |

(Continued)

FOREIGN PATENT DOCUMENTS

| | | |
|---|---|---|
| DE | 1118017 B | 11/1961 |
| DE | 0686554 A1 | 12/1995 |

(Continued)

OTHER PUBLICATIONS

European Search Report for European Application No. EP 22204458.8, Completed by the European Patent Office, Dated Mar. 14, 2023, 5 pages.

*Primary Examiner* — Philip J Bonzell
*Assistant Examiner* — Colin Zohoori
(74) *Attorney, Agent, or Firm* — Brooks Kushman P.C.

(57) ABSTRACT

A rotorcraft with at least one main rotor and a fuselage, comprising: a tail boom connected to the fuselage, the tail boom extending from the fuselage toward a duct-type portion; a shroud provided at the duct-type portion and forming a transverse duct; at least one ducted tail rotor rotatably arranged in the transverse duct, wherein the at least one ducted tail rotor comprises a plurality of rotor blades mounted to a rotatable rotor hub; and a stator with a gearbox fairing mounted to the shroud for supporting the rotatable rotor hub in the transverse duct, wherein the stator comprises at least one rotatable stator blade connecting the gearbox fairing to the shroud.

14 Claims, 3 Drawing Sheets

(56) References Cited

U.S. PATENT DOCUMENTS

| | | | | |
|---|---|---|---|---|
| 2,575,886 A | * | 11/1951 | Myers | B64C 27/82 |
| | | | | 244/6 |
| 3,055,618 A | * | 9/1962 | Brislawn, Jr. | B64C 11/001 |
| | | | | 244/87 |
| 3,116,898 A | | 1/1964 | Clark et al. | |
| 4,828,203 A | | 5/1989 | Clifton et al. | |
| 5,855,709 A | | 1/1999 | Bocoviz et al. | |
| 2006/0225404 A1 | * | 10/2006 | Dev | F01D 15/02 |
| | | | | 60/200.1 |
| 2016/0083083 A1 | * | 3/2016 | Bordoley | B64C 21/10 |
| | | | | 244/200.1 |
| 2021/0362836 A1 | * | 11/2021 | Parks | B64C 29/0025 |

FOREIGN PATENT DOCUMENTS

| | | |
|---|---|---|
| EP | 1173360 A1 | 1/2002 |
| EP | 3424818 A1 | 1/2019 |
| EP | 3532378 A1 | 9/2019 |
| GB | 606420 A | 8/1948 |
| GB | 869632 A | 6/1961 |
| WO | 0064736 A1 | 11/2000 |
| WO | 2018078386 A1 | 5/2018 |

\* cited by examiner

ROTORCRAFT WITH A DUCTED TAIL ROTOR SUPPORTED BY A STATOR

CROSS-REFERENCE TO RELATED APPLICATIONS

This application claims priority to European patent application No. EP 22204458.8 filed on Oct. 28, 2022, the disclosure of which is incorporated in its entirety by reference herein.

TECHNICAL FIELD

The present disclosure is related to a rotorcraft with at least one main rotor and a fuselage, comprising a tail boom connected to the fuselage, the tail boom extending from the fuselage toward a duct-type portion, a shroud provided at the duct-type portion and forming a transverse duct, at least one ducted tail rotor rotatably arranged in the transverse duct, and a counter-torque stator for supporting the at least one ducted tail rotor in the transverse duct.

BACKGROUND

The document EP 0 686 554 A1 describes a rotorcraft having a counter-torque rotor that is positioned at a duct-type portion of a tail boom of the rotorcraft. The duct-type portion is provided with a vertical fin and a shroud that defines a transverse duct. The counter-torque rotor is rotatably arranged within the transverse duct and, thus, embodied as a ducted tail rotor in the form of a Fenestron® tail rotor. More specifically, the ducted tail rotor is supported in the transverse duct by a counter-torque stator having a plurality of rigidly mounted stator blades.

The document EP 3 424 818 A1 also describes a rotorcraft with a main rotor and a counter-torque rotor that is positioned at a duct-type portion of a tail boom of the rotorcraft. The duct-type portion is provided with a shroud that defines a transverse duct, a bumper, and a vertical fin that is provided with an associated tail wing in a so-called T-tail configuration. The counter-torque rotor is provided for counteracting main rotor torque created by the main rotor on a respective airframe of the rotorcraft. More specifically, the counter-torque rotor is rotatably arranged within the transverse duct located at the duct-type portion of the tail boom and, thus, embodied as a ducted tail rotor in the form of a Fenestron® tail rotor. The ducted tail rotor is supported in the transverse duct by a counter-torque stator having a plurality of rigidly mounted stator blades.

In the above-described rotorcrafts, the respective stator blades of the counter-torque rotors are essentially optimized for an airflow through the associated transverse ducts in hover flight condition of the rotorcrafts in order to generate only negligible airflow blocking forces. However, in contrast thereto the respective stator blades cause a significant, comparatively high aerodynamic drag in fast forward flight condition of the rotorcrafts as at least part of the respective stator blades are arranged mainly perpendicular to the airflow through the associated transverse ducts.

The documents EP 1 173 360 A1, EP 3 532 378 A1, U.S. Pat. Nos. 3,116,898 A, and 4,828,203 A describe rotorcrafts with ducted rotors arranged in transverse ducts provided with flaps. The ducted rotors are supported in the transverse ducts by rigidly mounted stators which may have rigidly mounted stator blades. The flaps may be rotated to close the transverse ducts in fast forward flight condition of the rotorcrafts such that generation of aerodynamic drag at the transverse ducts and, thus, at the stator blades is avoided or at least significantly reduced.

Furthermore, the document GB 869 632 A describes another rotorcraft with a ducted rotor arranged in a transverse duct provided with flaps. The ducted rotor is supported in the transverse duct by a rigidly mounted stator. The flaps may be rotated to redirect an airflow through the transverse duct in order to generate thrust in a desired direction.

Nevertheless, these documents are not related to rotorcrafts with counter-torque devices provided at duct-type tail portions of tail booms of the rotorcrafts.

However, the document DE 1 118 017 B describes a rotorcraft with a ducted tail rotor arranged in a transverse duct provided at duct-type tail portion of a tail boom of the rotorcraft. The ducted tail rotor is supported in the transverse duct by a rigidly mounted stator with rigidly mounted stator blades and the transverse duct is provided with flaps. The flaps may be rotated to close the transverse duct in fast forward flight condition of the rotorcraft such that generation of aerodynamic drag at the transverse duct and, thus, at the stator blades is avoided or at least significantly reduced. The documents GB606420 and U.S. Pat. No. 2,420,784 were cited.

SUMMARY

It is an object of the present disclosure to provide a new rotorcraft with a counter-torque device provided at a duct-type portion of a tail boom of the new rotorcraft, wherein the counter-torque device is designed to exhibit an improved aerodynamic behavior.

More specifically, according to the present disclosure a rotorcraft with at least one main rotor and a fuselage comprises a tail boom connected to the fuselage, the tail boom extending from the fuselage toward a duct-type portion. A shroud is provided at the duct-type portion and forms a transverse duct. At least one ducted tail rotor is rotatably arranged in the transverse duct. The at least one ducted tail rotor comprises a plurality of rotor blades mounted to a rotatable rotor hub. A stator with a gearbox fairing is mounted to the shroud for supporting the rotatable rotor hub in the transverse duct. The stator comprises at least one rotatable stator blade connecting the gearbox fairing to the shroud.

Advantageously, the inventive rotorcraft has a ducted tail rotor supported in a transverse duct by a stator with stator blades which are rotatable such that a respective aerodynamic drag caused by these stator blades may be reduced in both hover flight condition and (fast) forward flight condition of the rotorcraft. This is achieved by aligning at least a predetermined number of the stator blades of the stator automatically relative to an induced airflow such that they generate as low drag as possible in the induced airflow either.

In order to achieve such an alignment, preferably each rotatable stator blade comprises a circular stiff center strut and an aerodynamic profile that is mounted rotatably to the circular stiff center strut by means of suitable bearings. Thus, the induced airflow, which is induced by the ducted tail rotor or due to (fast) forward flight condition, automatically rotates the aerodynamic profile around the circular stiff center strut into a position of minimum aerodynamic drag.

More specifically, for each rotatable stator blade of a given stator with a stator hub or gearbox fairing, a circular stiff center strut is preferably rigidly attached at one axial end to an inside of an associated transverse duct and its other axial end is rigidly attached to the stator hub or gearbox fairing. The circular stiff center strut is encased with, i.e., at least partly accommodated in a wing-like aerodynamic profile which can freely rotate around a length axis of the circular stiff center strut by means of at least one, and preferably two bearings, for instance roller or ball bearings.

Preferably, the bearings are located in front of a respective aerodynamic center respectively pressure point of the wing-like aerodynamic profile. Thus, an airflow induced pressure respectively force may produce on the wing-like aerodynamic profile a torque moment which rotates the wing-like aerodynamic profile around the circular stiff center strut into a position of minimum aerodynamic drag.

For instance, in hover flight condition of a given rotorcraft a minimum aerodynamic drag is given for the wing-like aerodynamic profile being oriented perpendicular to a respective plane or rotation disc of the ducted tail rotor. In forward flight condition of the given rotorcraft the wing-like aerodynamic profile is rotated by a respective airflow force in a direction that is at least essentially parallel to a forward flight direction. Thus, also in the forward flight condition of the given rotorcraft the aerodynamic drag induced by the rotatable stator blades of the ducted tail rotor is at least significantly reduced.

According to a preferred embodiment, the at least one rotatable stator blade connects an outer surface of the gearbox fairing to an inner surface of the transverse duct.

According to a further preferred embodiment, the at least one rotatable stator blade comprises a wing-like body with a wing-like aerodynamic profile comprising an aerodynamic center.

According to a further preferred embodiment, the wing-like body is rotatable about a rotation axis that is spaced apart from the aerodynamic center.

According to a further preferred embodiment, the wing-like body is rotatably mounted to a stationary strut forming the rotation axis.

According to a further preferred embodiment, the wing-like body is rotatably mounted to the stationary strut via at least one bearing.

According to a further preferred embodiment, the stationary strut rigidly attaches the gearbox fairing to the shroud.

According to a further preferred embodiment, the wing-like body comprises a leading edge and a trailing edge, wherein the rotation axis is arranged closer to the leading edge than the associated aerodynamic center.

According to a further preferred embodiment, a torsion spring connects the wing-like body to one of the gearbox fairing, the shroud, or the stationary strut.

The torsion spring and, more particularly, a rotational spring may be used to bias the complete rotating wing-like aerodynamic profile into a predefined position, e.g., a predetermined hover flight condition position. In this case, the rotational spring may e.g., be provided with a stiffness that is low enough to allow rotation of the complete rotating wing-like aerodynamic profile in an angle ranging from perpendicular to flight direction, i.e., the hover flight condition position, to parallel to flight direction, i.e., a forward flight condition position. However, the stiffness should preferably be high enough to generate enough counter force in order to untwist a respective airflow induced by the ducted tail rotor.

According to a further preferred embodiment, the torsion spring is mounted coaxially to the stationary strut.

According to a further preferred embodiment, an airfoil-like extension is provided at the trailing edge of the wing-like body.

According to a further preferred embodiment, the airfoil-like extension and the wing-like body are configured to generate forces directed into diametrically opposed directions.

More specifically, conventional stator blades usually fulfill also the task of untwisting a respective airflow behind the rotor blades of the ducted tail rotor in order to obtain higher aerodynamic efficiency mainly in hover flight condition or slow forward flight condition of a given rotorcraft. However, for this the conventional stator blades need a kind of counter force in order to untwist the respective airflow. This may advantageously be achieved by means of the airfoil-like extension provided on the rotatable stator blades according to the present disclosure.

The airfoil-like extension may, e.g., be an integrated flap that adds a certain aerodynamic counteracting moment to the wing-like body, i.e., the wing-like aerodynamic profile of the at least one rotatable stator blade. Accordingly, the complete rotating wing-like aerodynamic profile is loaded with a small counter rotating force and, thus, enough force to fulfil the above-mentioned task of untwisting the respective airflow behind the rotor blades of the ducted tail rotor.

According to a further preferred embodiment, the at least one rotatable stator blade rotates in response to an airflow induced pressure generated by an airflow acting on the at least one rotatable stator blade.

According to a further preferred embodiment, the at least one rotatable stator blade rotates into an operating position associated with reduced drag generation.

According to a further preferred embodiment, the above-described rotorcraft is embodied as a helicopter, wherein the tail boom extends in a longitudinal direction of the helicopter from the fuselage toward the duct-type portion, and wherein the at least one ducted tail rotor is rotatable in the transverse duct about an associated tail rotor rotation axis oriented at least essentially perpendicular to the longitudinal direction of the helicopter.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
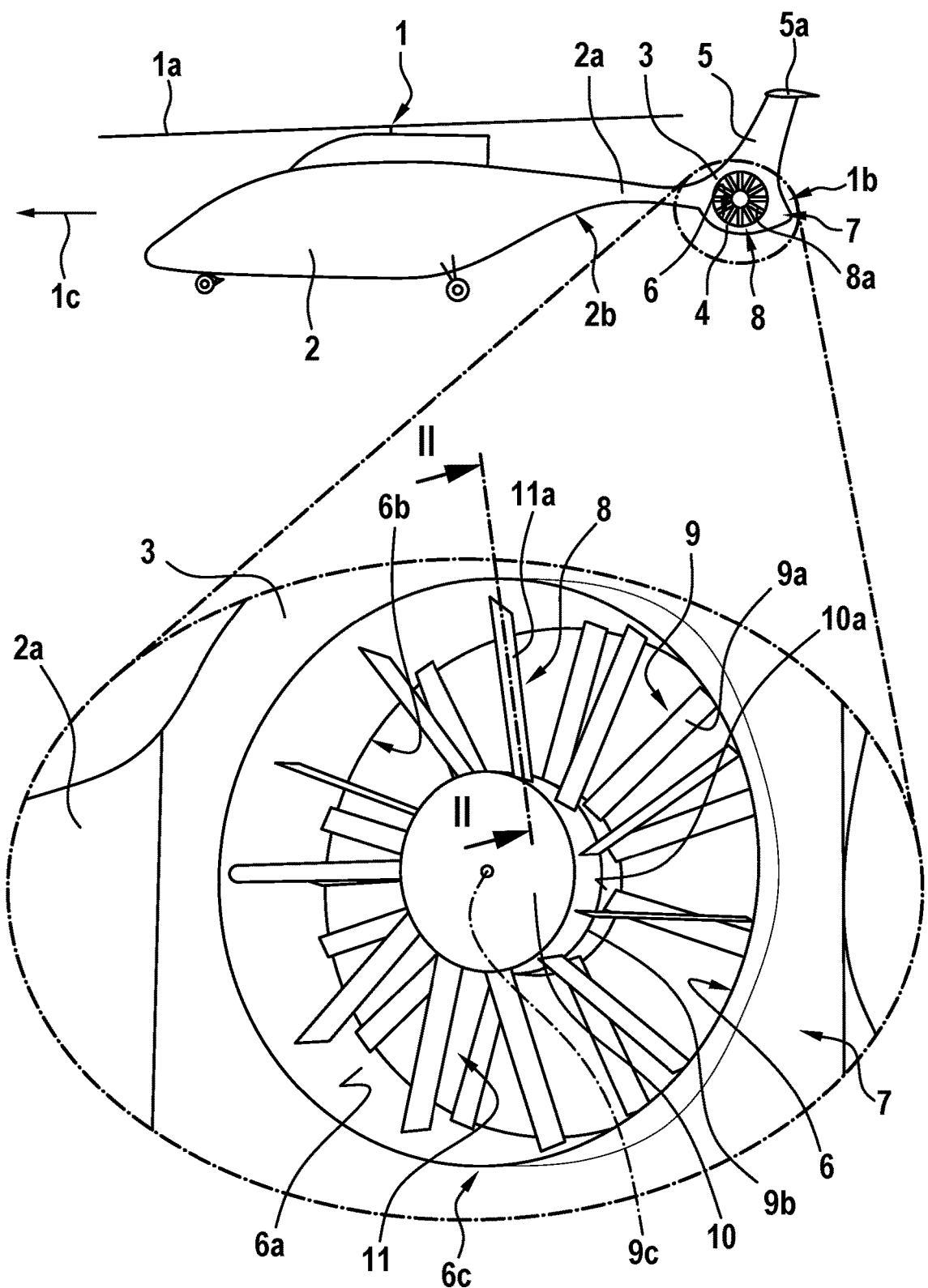
FIG. 1 shows a side view of a rotorcraft comprising a tail boom extending toward a duct-type tail portion with a ducted tail rotor and a stator having a plurality of stator blades according to the disclosure.

FIG. 1 shows a rotorcraft 1 with a fuselage 2 and a tail boom 2a that is connected to the fuselage 2 at a rear fuselage 2b. The tail boom 2a extends in its longitudinal direction from the fuselage 2 and, more particularly, from the rear fuselage 2b toward at least one duct-type tail portion 7 with a shroud 3. The at least one duct-type tail portion 7 is referred to hereinafter as "the duct-type portion 7", for simplicity and brevity.

The rotorcraft 1 is preferably embodied as a helicopter and, therefore, also referred to hereinafter as "the helicopter 1", for simplicity and brevity. By way of example, the helicopter 1 is shown in forward flight condition in a forward flight direction 1c. The forward flight direction 1c coincides with the longitudinal direction of the fuselage 2, i.e., the helicopter 1, and may, therefore, also be referred to as "the longitudinal direction 1c" hereinafter.

The helicopter 1 comprises at least one main rotor 1a configured to provide lift and/or forward thrust during operation, and at least one counter-torque device 8 configured to provide counter-torque during operation, i.e., to counter the torque created by rotation of the at least one main rotor 1a for purposes of balancing the helicopter 1 in terms of yaw. It should, however, be noted that the present disclosure is not limited to helicopters and may likewise be applied to other aircrafts that are equipped with rotary wings and at least one counter-torque device similar to the helicopter 1.

The at least one counter-torque device 8 is illustratively provided at an aft section 1b of the helicopter 1, which preferably comprises the duct-type portion 7. By way of example, the aft section 1b further comprises a bumper 4 and a fin 5 connected to the duct-type portion 7 and, more particularly, to the shroud 3 of the duct-type portion 7. The fin 5 is illustratively in the form of a T-tail having a tail wing 5a. The tail wing 5a is preferably adjustable in its inclination and can overtake the functioning of a horizontal stabilizer. Alternatively, or in addition, the helicopter 1 may be provided with a suitable horizontal stabilizer.

However, it should be noted that the T-tail configuration of the fin 5 having the tail wing 5a is merely described for illustrating one exemplary realization of the helicopter 1 and not for limiting the present disclosure accordingly. Instead, the present disclosure as described hereinafter can be used with any helicopter and, more generally, any rotorcraft having a duct-type portion with a ducted tail rotor, independent on whether this duct-type portion is connected to a T-tail fin or an otherwise configured fin, with or without a tail wing. Furthermore, the fin 5 may optionally be provided with a rudder that may be adapted to provide for enhanced directional control of the helicopter 1, e.g., by being deflected to large angles to reduce a given lateral drag of the fin 5 in sideward flight.

Illustratively, the duct-type portion 7 and, more particularly, the shroud 3 forms at least one transverse duct 6 having preferentially an at least approximately circular or annular cross section. The at least one transverse duct 6 illustratively extends through the shroud 3 and has an inner ring-shaped surface 6a that is formed by the shroud 3. Illustratively, the transverse duct 6 comprises an air inlet region (6b in FIG. 2) and an air outlet region 6c.

According to the present disclosure, at least one counter-torque rotor 9 with a plurality of rotor blades is rotatably arranged in the transverse duct 6 of the shroud 3 and rotatable about an associated tail rotor rotation axis 9c oriented at least essentially perpendicular to the longitudinal direction 1c of the helicopter 1. For simplicity and clarity of the drawing only a single rotor blade of the plurality of rotor blades is individually labelled with the reference sign 9a.

The rotor blade 9a and, more generally, the plurality of rotor blades of the at least one counter-torque rotor 9 is connected to a rotatable rotor hub 9b. The at least one counter-torque rotor 9 illustratively forms a so-called Fenestron® tail rotor. Accordingly, for simplicity and clarity, the at least one counter-torque rotor 9 is hereinafter also referred to as "the ducted tail rotor 9".

Furthermore, a stator 11 with a stator hub 10 that illustratively forms a gearbox fairing and that is, therefore, also referred to hereinafter for simplicity as "the gearbox fairing 10", is mounted to the shroud 3. The stator 11, the ducted tail rotor 9, and the shroud 3, i.e., the transverse duct 6, illustratively define the at least one counter-torque device 8 of the helicopter 1.

More specifically, the gearbox fairing 10 is mounted to the transverse duct 6 for supporting the rotatable rotor hub 9b in the transverse duct 6 such that the rotatable rotor hub 9b may rotate relative to the gearbox fairing 10 in the transverse duct 6. The stator 11 comprises at least one rotatable stator blade 11a connecting the gearbox fairing 10 to the shroud 3, as described in more detail below at FIG. 2.

Illustratively, the stator 11 comprises a plurality of stator blades connecting the gearbox fairing 10 to the shroud 3. Preferably, each one of the plurality of stator blades is embodied as a rotatable stator blade similar to the at least one rotatable stator blade 11a, which is referred to hereinafter as "the rotatable stator blade 11a", for simplicity and brevity.

Figure 2:
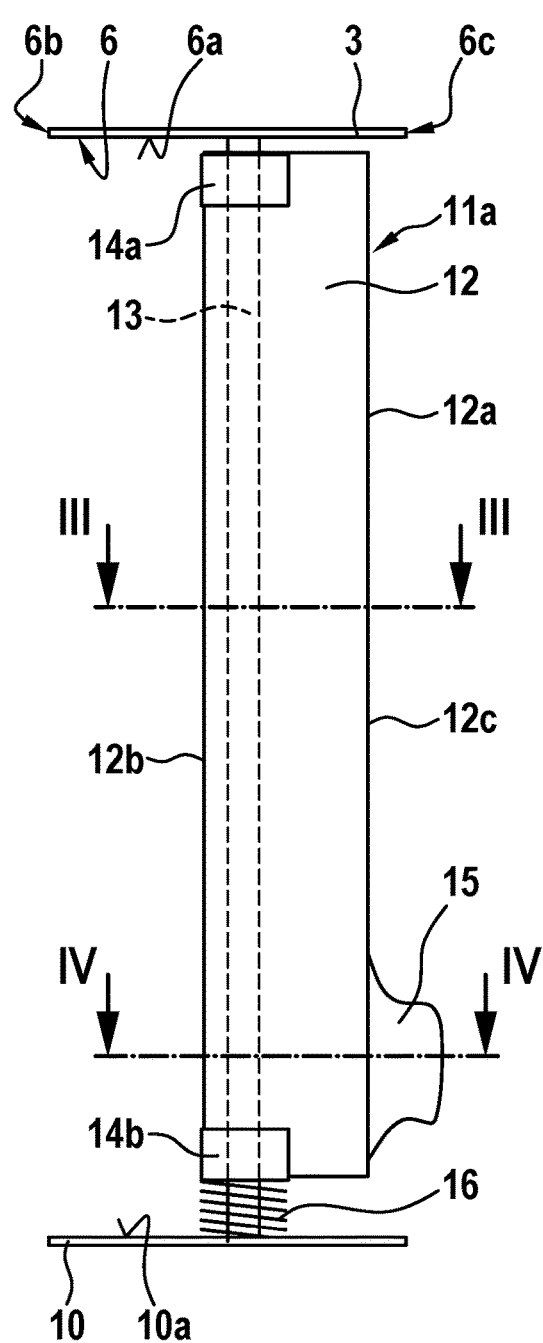
FIG. 2 shows a cut view of one of the plurality of stator blades of FIG. 1 with a wing-like stator blade body, seen along a cut line II-II of FIG. 1.

FIG. 2 shows the rotatable stator blade 11a of FIG. 1, which connects the gearbox fairing 10 of FIG. 1 to the shroud 3 of FIG. 1, and which is described representative for all rotatable stator blades of FIG. 1 hereinafter. The shroud 3 is shown with the transverse duct 6 having the inner ring-shaped surface 6a and the air outlet region 6c according to FIG. 1, as well as an air inlet region 6b. The rotatable stator blade 11a illustratively connects the inner surface 6a of the transverse duct 6 to an outer surface 10a of the gearbox fairing 10.

Preferably, the rotatable stator blade 11a comprises a wing-like body 12 with a wing-like aerodynamic profile 12a. Illustratively, the wing-like body 12, i.e., the wing-like aerodynamic profile 12a comprises a leading edge 12b and a trailing edge 12c. Accordingly, the rotatable stator blade 11a is shown in FIG. 2 by way of example in a hover flight condition position adopted in hover flight condition of the helicopter 1 of FIG. 1.

Illustratively, an airfoil-like extension 15 is provided at the trailing edge 12c of the wing-like body 12. By way of example, the airfoil-like extension 15 is embodied as a flap which is only arranged on a comparatively small part of the trailing edge 12c.

More specifically, the wing-like body 12 is preferably rotatable about an associated rotation axis. For instance, the wing-like body 12 may be rotatably mounted to a stationary strut 13 forming the associated rotation axis. Illustratively, the stationary strut 13 rigidly attaches the gearbox fairing 10 to the shroud 3.

The wing-like body 12 is preferably rotatably mounted to the stationary strut 13 via at least one bearing and, illustratively, via two bearings 14a, 14b. By way of example, the two bearings 14a, 14b may be embodied as roller bearings or ball bearings.

Furthermore, the wing-like body 12 and/or the bearing 14b is/are illustratively connected via a torsion spring 16 to the gearbox fairing 10. The torsion spring 16 is preferably mounted coaxially to the stationary strut 13. More specifically, the torsion spring 16, which may also be referred to as a rotational spring, is preferably provided to bias the wing-like body 12 into the hover flight condition position. Alternatively, the torsion spring 16 may bias the wing-like body 12 into a forward flight condition position. Optionally, a damper may be provided to dampen a movement of the wing-like body 12 that is induced by the torsion spring 16.

Figure 3:
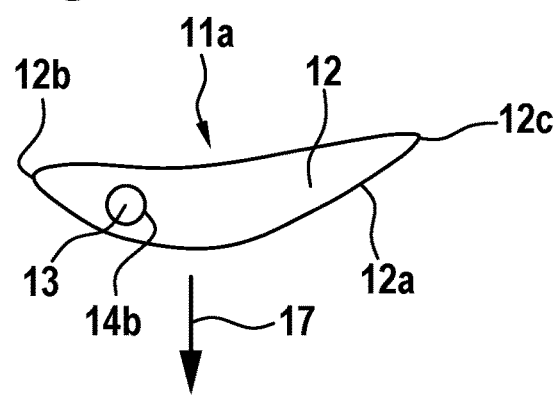
FIG. 3 shows a cut view of the stator blade of FIG. 2, seen along a cut line of FIG. 2.

FIG. 3 shows the rotatable stator blade 11a of FIG. 2 with the wing-like body 12 having the wing-like aerodynamic profile 12a with the leading edge 12b and the trailing edge 12c. The wing-like body 12 is rotatably mounted to the stationary strut 13 by means of the bearing 14b.

FIG. 3 illustrates an aerodynamic moment resp. force 17 that is generated by the wing-like body 12 in response to an airflow induced pressure. The aerodynamic moment resp. force 17 rotates the wing-like body 12 about the stationary strut 13 into an operating position associated with reduced drag generation, as described in more detail below at FIG. 5.

Figure 4:
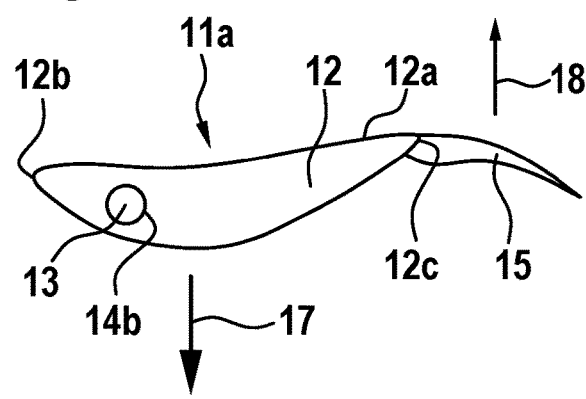
FIG. 4 shows a cut view of the stator blade of FIG. 2 with an airfoil-like extension, seen along a cut line IV-IV of FIG. 2.

FIG. 4 shows the rotatable stator blade 11a of FIG. 2 with the wing-like body 12 having the wing-like aerodynamic profile 12a with the leading edge 12b and the trailing edge 12c. The wing-like body 12 is rotatably mounted to the stationary strut 13 by means of the bearing 14b and comprises the airfoil-like extension 15.

Preferably, the airfoil-like extension 15 and the wing-like body 12 are configured to generate moments resp. forces directed into diametrically opposed directions. More specifically, the wing-like body 12 generates the aerodynamic moment resp. force 17 of FIG. 3 in response to an airflow induced pressure, and the airfoil-like extension 15 generates an aerodynamic moment resp. force 18 in a diametrically opposed direction relative to the aerodynamic moment resp. force 17. Thus, a respective airflow flowing around the wing-like body 12 in the hover flight condition position may advantageously be untwisted.

Figure 5:
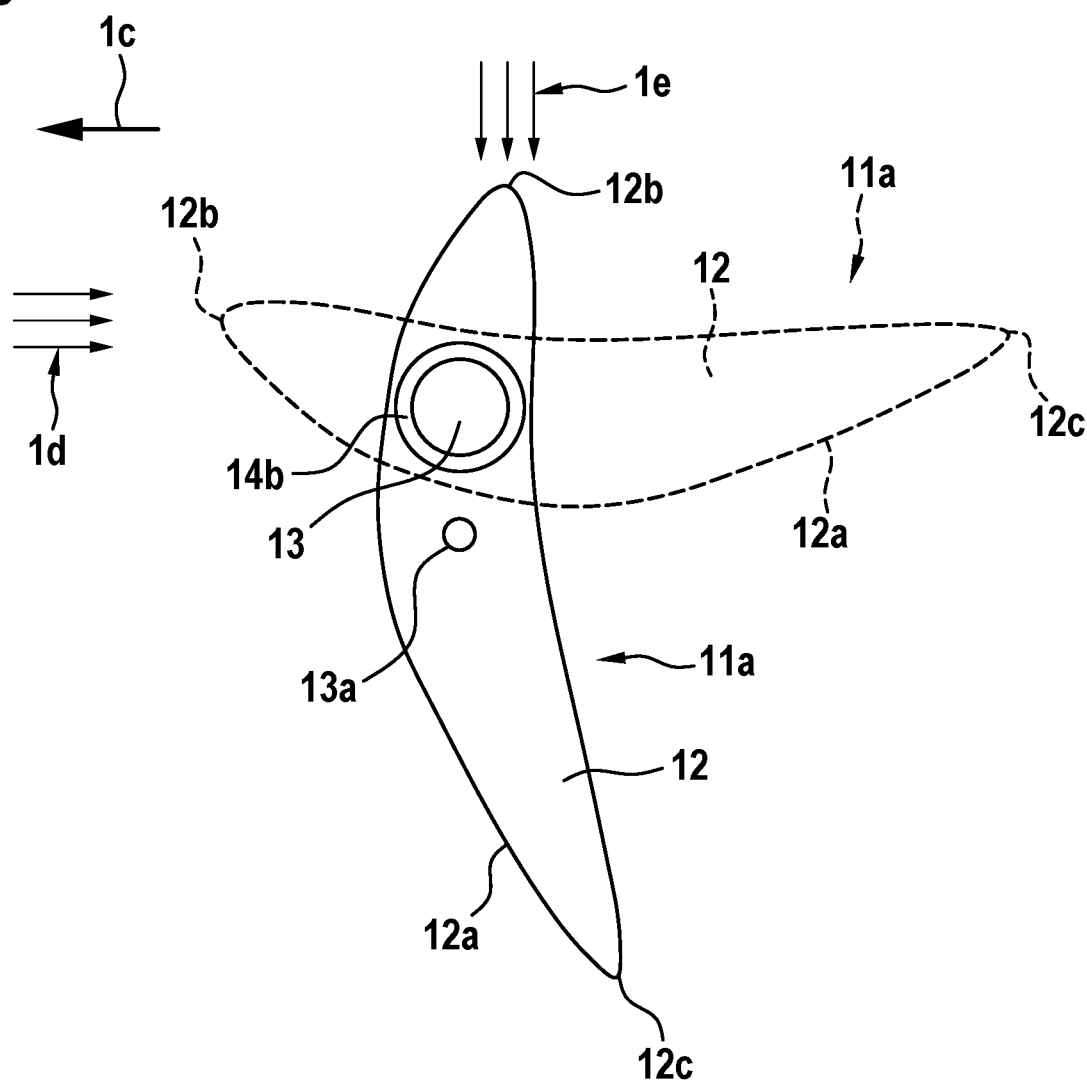
FIG. 5 shows the stator blade of FIG. 2 to FIG. 4 in operation.

FIG. 5 shows the rotatable stator blade 11a of FIG. 2 and FIG. 3 with the wing-like body 12 having the wing-like aerodynamic profile 12a with the leading edge 12b and the trailing edge 12c. The wing-like body 12 is rotatably mounted to the stationary strut 13, which forms the rotation axis for the wing-like body 12, by means of the bearing 14b.

Furthermore, an aerodynamic center respectively pressure point 13a of the wing-like body 12, i.e., the aerodynamic profile 12a is shown. The aerodynamic center 13a is preferably spaced apart from the rotation axis formed by the stationary strut 13. Preferably, the rotation axis is arranged closer to the leading edge 12b of the wing-like body 12 than the aerodynamic center 13a.

Preferably, the bearing 14b is located in front of the aerodynamic center 13a of the wing-like aerodynamic profile 12a. Thus, an airflow induced pressure respectively force may produce on the wing-like aerodynamic profile 12a a torque moment which rotates the wing-like aerodynamic profile 12a, i.e., the wing-like body 12 around the stationary strut 13 into a position of minimum aerodynamic drag.

Illustratively, the rotatable stator blade 11a is shown in dotted lines in a forward flight condition position in forward flight condition in the forward flight direction 1c of the helicopter 1 of FIG. 1. More specifically, in the forward flight condition in the forward flight direction 1c, an airflow 1d acts on the rotatable stator blade 11a, i.e., the wing-like body 12 and generates an airflow induced pressure on the wing-like body 12. The stator blade 11a, i.e., the wing-like body 12 rotates in response to the airflow induced pressure generated by the airflow 1d into the forward flight condition position that is associated with reduced drag generation in the forward flight condition of the helicopter 1 of FIG. 1.

By way of example, the rotatable stator blade 11a is further shown in continued lines in a hover flight condition position in hover flight condition of the helicopter 1 of FIG. 1. More specifically, in the hover flight condition an airflow 1e that is e.g., generated by the ducted tail rotor 9 of FIG. 1 acts on the rotatable stator blade 11a, i.e., the wing-like body 12 and generates an airflow induced pressure on the wing-like body 12. The stator blade 11a, i.e., the wing-like body 12 rotates in response to the airflow induced pressure generated by the airflow 1e into the hover flight condition position that is associated with reduced drag generation in the hover flight condition of the helicopter 1 of FIG. 1.

It should be noted that the above described, preferred embodiments are merely described to illustrate possible embodiments of the present disclosure, but not in order to restrict the present disclosure thereto. Instead, multiple modifications and variations of the disclosure are possible and should, therefore, also be considered as being part of the disclosure.

For instance, while according to the illustrated embodiment in FIG. 2 the torsion spring 16 connects the wing-like body 12 and/or the bearing 14b to the gearbox fairing 10, the torsion spring 16 may likewise be used to connect the wing-like body 12 and/or the bearing 14a of FIG. 2 to the shroud 3, or instead to the stationary strut 13 of FIG. 2. Moreover, although a particular number of stator blades is shown in FIG. 1, the number of respectively used stator blades may depend on a given helicopter type. Furthermore, although the airfoil-like extension 15 in FIG. 2 is illustrated as an immobile part of the wing-like body 12, it may e.g., be rotatably attached to the wing-like body 12, and so on.

REFERENCE LIST 1 rotorcraft
1a main rotor
1b rotorcraft aft section
1c rotorcraft forward flight direction resp. rotorcraft longitudinal direction
1d airflow in forward flight condition
1e airflow in hover flight condition
2 fuselage
2a tail boom
2b rear fuselage
3 shroud
4 bumper
5 fin
5a tail wing
6 transverse duct
6a duct inner ring-shaped surface
6b air inlet region
6c air outlet region
7 duct-type tail portion
8 counter-torque device
9 counter-torque rotor
9a rotor blades
9b rotor hub
9c counter-torque rotor rotation axis
10 gearbox fairing
10a gearbox fairing outer surface
11 counter-torque stator
11a stator blade
12 wing-like stator blade body
12a wing-like aerodynamic profile
12b leading edge
12c trailing edge
13 stationary strut, rotation axis
13a aerodynamic center of wing-like aerodynamic profile
14a, 14b bearings
15 airfoil-like extension 16 torsion spring
17 aerodynamic moment resp. force
18 counter force

What is claimed is:

1. A rotorcraft with at least one main rotor and a fuselage, comprising:
   a tail boom connected to the fuselage, the tail boom extending from the fuselage toward a duct-type portion;
   a shroud provided at the duct-type portion and forming a transverse duct;
   at least one ducted tail rotor rotatably arranged in the transverse duct, wherein the at least one ducted tail rotor comprises a plurality of rotor blades mounted to a rotatable rotor hub; and
   a stator with a gearbox fairing mounted to the shroud for supporting the rotatable rotor hub in the transverse duct, wherein the stator comprises at least one rotatable stator blade connecting the gearbox fairing to the shroud, and a torsion spring connected to the at least one rotatable stator blade;
   wherein the at least one rotatable stator blade has a wing body having a wing aerodynamic profile, the at least one rotatable stator blade having a leading edge and a trailing edge, each wing aerodynamic profile has an aerodynamic center acting as a pressure point, wherein the at least one rotatable stator blade is rotatably mounted to a stationary strut which forms a rotation axis for the wing body, the at least one rotatable stator blade rotatable between a first hover flight position and a second forward flight position, the first hover flight position being perpendicular to the rotation disc of the ducted tail rotor and associated with a hover flight condition of the rotorcraft, the torsion spring to bias the at least one rotatable stator blade towards the first hover flight position; and
   wherein the aerodynamic center is spaced apart from the rotation axis, and the rotation axis is arranged closer to the leading edge than the aerodynamic center, in front of the aerodynamic center, thus producing an airflow induced pressure on the wing aerodynamic profile generating a torque moment which causes rotation of the wing body around the rotation axis into a position of reduced aerodynamic drag.

2. The rotorcraft of claim 1, wherein the at least one rotatable stator blade connects an outer surface of the gearbox fairing to an inner surface of the transverse duct.

3. The rotorcraft of claim 1, wherein the wing body is rotatably mounted to the stationary strut via at least one bearing.

4. The rotorcraft of claim 1, wherein the stationary strut rigidly attaches the gearbox fairing to the shroud.

5. The rotorcraft of claim 1, wherein the torsion spring connects the wing body to one of the gearbox fairing, the shroud, or the stationary strut.

6. The rotorcraft of claim 5, wherein the torsion spring is mounted coaxially to the stationary strut.

7. The rotorcraft of claim 1, wherein an airfoil extension is provided at the trailing edge of the wing body.

8. The rotorcraft of claim 7, wherein the airfoil extension and the wing body are configured to generate forces directed into diametrically opposed directions.

9. The rotorcraft of claim 1, which is embodied as a helicopter, wherein the tail boom extends in a longitudinal direction of the helicopter from the fuselage toward the duct-type portion, and wherein the at least one ducted tail rotor is rotatable in the transverse duct about an associated tail rotor rotation axis oriented at least essentially perpendicular to the longitudinal direction of the helicopter.

10. A rotorcraft comprising:
    a fuselage supporting a main rotor;
    a tail boom extending from the fuselage to a shroud defining a transverse duct;
    a stator with a stationary strut extending inward from the shroud to a fairing to connect the fairing to the shroud;
    a ducted tail rotor rotatably supported within the transverse duct, the ducted tail rotor having a plurality of rotor blades mounted to a rotatable rotor hub, the fairing supporting the rotatable rotor hub within the transverse duct;
    a rotatable stator blade formed by a wing body extending from a leading edge to a trailing edge with an aerodynamic center therebetween, the wing body mounted for rotation about a rotation axis defined by the stationary strut between a first hover flight position and a second forward flight position, wherein the first hover flight position is perpendicular to the rotation disc of the ducted tail rotor, and is associated with a hover flight condition of the rotorcraft; and
    a torsion spring connected to the rotatable stator blade to bias the rotatable stator blade towards the first hover flight position;
    wherein the rotation axis is positioned between the leading edge and the aerodynamic center, and the rotation axis is spaced apart from the aerodynamic center, such that the wing body is rotatable about the rotation axis by an induced airflow to reduce aerodynamic drag.

11. The rotorcraft of claim 10 wherein the second forward flight position is parallel to a forward flight direction of the rotorcraft.

12. The rotorcraft of claim 10 further comprising an airfoil extension extending outwardly from the trailing edge of the wing body, the wing body and airfoil extension arranged to generate forces in diametrically opposed directions to one another.

13. The rotorcraft of claim 12 wherein the airfoil extension is a flap that extends along only a portion of the trailing edge of the wing body.

14. A rotorcraft comprising:
    a fuselage supporting a main rotor;
    a tail boom extending from the fuselage to a shroud defining a transverse duct;
    a stator with a plurality of stationary struts, each extending radially inward from the shroud to a fairing to connect the fairing to the shroud;
    a ducted tail rotor rotatably supported within the transverse duct, the ducted tail rotor having a plurality of rotor blades mounted to a rotatable rotor hub, the fairing supporting the rotatable rotor hub within the transverse duct;
    a plurality of rotatable stator blades, each rotatable stator blade formed by a wing body extending from a leading edge to a trailing edge with an aerodynamic center therebetween, each wing body mounted for rotation about a rotation axis defined by an associated one of the plurality of stationary struts between a first hover flight position associated with a hover flight condition of the rotorcraft with the rotatable stator blade perpendicular to the rotation disc of the ducted tail rotor and a second forward flight position associated with a forward flight condition of the rotorcraft; and a plurality of torsion springs, each torsion spring connected to a respective one of the plurality of rotatable stator blades to bias the associated rotatable stator blade towards the first hover flight position;

wherein, for each rotatable stator blade, the rotation axis is positioned between the leading edge and the aerodynamic center, and the rotation axis is spaced apart from the aerodynamic center, such that the wing body rotates about the rotation axis in response to a force on the wing body from an induced airflow to reduce aerodynamic drag.

\* \* \* \* \*